United States Patent [19]

Rosenthal et al.

[11] 4,348,457
[45] Sep. 7, 1982

[54] SEALABLE MULTILAYER FILM OF POLYOLEFINS

[75] Inventors: Heinrich Rosenthal; Ingo Schinkel, both of Walsrode; Günter Eger, Bomlitz, all of Fed. Rep. of Germany

[73] Assignee: Wolff Walsrode Aktiengesellschaft, Leverkusen, Fed. Rep. of Germany

[21] Appl. No.: 196,604

[22] Filed: Oct. 14, 1980

[30] Foreign Application Priority Data

Oct. 17, 1979 [DE] Fed. Rep. of Germany ....... 2941909

[51] Int. Cl.$^3$ .................. B32B 27/32; B32B 31/16
[52] U.S. Cl. .................................... 428/349; 428/354; 428/411; 428/447; 428/475.8; 428/516; 428/520; 428/523; 428/451
[58] Field of Search ............... 428/451, 347, 516, 411, 428/349, 447, 475.8, 520, 523, 354

[56] References Cited

U.S. PATENT DOCUMENTS

| | | | |
|---|---|---|---|
| 2,992,201 | 7/1961 | Gober | 260/29.1 SB |
| 4,132,050 | 2/1979 | Young | 428/516 |
| 4,230,767 | 10/1980 | Isaka | 428/516 |
| 4,252,851 | 2/1981 | Lansbury | 428/347 |

*Primary Examiner*—Ellis P. Robinson
*Attorney, Agent, or Firm*—Connolly and Hutz

[57] ABSTRACT

A sealable multilayer film for packaging comprising a polypropylene film and at least one sealing layer of an ethylene homo- or copolymer wherein the sealing layer contains an additive combination of a long-chain amine, a thermoplastic polymer incompatible with the sealing polymer and a polydialkyl siloxane.

10 Claims, No Drawings

SEALABLE MULTILAYER FILM OF POLYOLEFINS

This invention relates to sealable, orientated multilayer films of polyolefins which are particularly suitable for use as packaging films, especially for wrapping packs of cigarettes.

The use of ethylene homopolymers or copolymers for producing sealable, oriented packaging films has been known for a long time.

Repeated attempts have been made to improve the properties of these multilayer films. Thus, German Pat. No. 1,161,679 describes a process for the production of a multilayer film of an ethylene homopolymer which is characterised by high welding strength and a strong bond between its constituent layers.

German Offenlegungsschrift No. 1,504,352 describes a process for improving the heat-sealing properties of oriented thermoplastic film of polypropylene and a polyethylene coating. In this process, the sealing zone of the wrapping does not shrink to any significant extent during the welding process, with the result that neither the appearance nor the seam strength of the wrapping are adversely affected.

German Offenlegungsschrft No. 1,504,625 describes multilayer films consisting of a middle layer of polypropylene and outer layers of polyethylene.

However, all these known multilayer films give rise to difficulties when they are not used in high-speed wrapping machines, particularly in high-speed machines for wrapping cigarette packs. More particularly, faulty weld seams and faulty wrappings occur at the high wrapping speeds, leading to interuptions in operation. In addition the machine also becomes covered with coatings of abrasion dust.

In most known films fatty acid amides are used for improving the sliding properties, but unfortunately films containing fatty acid amides are not suitable for use in high speed machines. Neither the desired result is obtained by the addition of an incompatible thermoplastic resin described in German Offenlegungsschrift No. 2,225,703.

Accordingly, the object of the present invention is to improve the properties of a multilayer film that it combines very good sliding properties with processability in high-speed machines. Thus, they are particularly suitable for the use as a wrapping for cigarette packs.

According to the invention, this object is achieved by a sealable, oriented multilayer film consisting of at least one polypropylene layer and at least one sealable layer of polyethylene or an ethylene copolymer containing at least 4% by weight of ethylene on it wherein the sealable layer contains an additive combination consisting of:

1. from 0.3 to 1.0% by weight, and preferably from 0.4 to 0.7% by weight, based on the sealable layer, of a long-chain aliphatic amine,
2. from 0.1 to 7.0% by weight, and preferably from 0.15 to 0.50% by weight, based on the sealable layer, of a dispersed thermoplastic polymer which is incompatible with the polyethylene or the ethylene copolymer and which has a softening point not more than either 50° C. below or 50° C. above the softening point of the polyethylene or ethylene copolymer, and
3. from 0.2 to 0.8% by weight, and preferably from 0.3 to 0.6% by weight, based on the sealable layer, of a polydialkyl siloxane.

The polypropylene which forms the core layer is preferably an isotactic polypropylene having a density of from 0.90 to 0.91 g/cc and a melt flow index of from 1 to 4 g/10 mins. at 230° C./2.16 kp/cm$^2$ pressure (according to DIN No. 53 735).

The sealable layer polymer consists of an ethylene homopolymer or copolymer. It is preferred to use a high-density polyethylene or a statistical ethylene/propylene copolymer containing at least 4% by weight of ethylene, preferably 95% by weight of propylene and 5% by weight of ethylene.

The sealable layer polymer should preferably have a density in the range from 0.895 to 0.960 g/cc, a melt flow index of from 1 to 7 g/10 mins. at 190° C./2.16 kp/cm$^2$ pressure and a crystallite melting point, according to type, of from 125° to 148° C. (under a polarisation microscope).

(Component 1) of the additive combination is preferably a long-chain, aliphatic, optionally mono-unsaturated tertiary amines, preferably tertiary amines of which the aliphatic radical has a C-chain length of from $C_{12}$ to $C_{18}$ and which are substituted by two hydroxyalkyl ($C_1$–$C_4$) groups. N,N-bis-(2-hydroxyethyl)-($C_{12}$–$C_{16}$)-alkyl amines are particularly preferred.

The thermoplastic polymer incompatible with the sealing polymer should have a softening point which is not more than 50° C. below or 50° C. above the softening point of the sealable polymer and should be dispersed in the sealable polymer, preferably with a particle size of from 0.01 to 4 μm and, more particularly, from 0.1 to 2 μm. The incompatible polymer is dispersed in the sealable polymer by conventional methods. It is preferred to use thermoplastic resins, such as ethylene/methacrylic acid copolymer(melting range from 90° to 99° C.), polylauric lactamide (180° C.), acrylonitrile/butadiene/methacrylate copolymers (80° C.), ethylene/vinyl alcohol copolymers (185° C.). Ethylene/methacrylic acid copolymers, which may optionally be completely or partly present in the form of alkali salts, preferably as Zn salt, and polylauric lactam are particularly preferred.

The polydialkyl siloxane used as the third additive component should preferably have a viscosity of at least 1 million CST at 20° C. It is particularly preferred to use polydimethyl siloxane.

By using the additive combination according to the invention, it is possible not only to produce multilayer films combining very good sliding properties with a very good processability in high-speed machines, but also to avoid the usual electrical pretreatment of the films which is known to impair the sliding properties of the films. Neither is there any evidence of scratching or clouding of the films which occurs by using an inorganic powder.

Surprisingly, there is also no deterioration in the affinity of the film for bonding, although the use of polyalkyl siloxanes might have been expected to produce such a deterioration.

Accordingly, it has been surprising that the required improvement in the known multilayer films could be achieved with the inventive additive combination, especially since even the use of known lubricants, for example, saturated or unsaturated fatty acid amides and relatively high molecular weight substituted fatty acid amides melting at temperatures of from 70° to 150° C., for example, erucic acid amides, oleic acid amide, alkyl difatty acid amides and N,N-polyethoxylated fatty acid amides, does not produce adequate sliding properties in high-speed wrapping machines.

Accordingly, the present invention also relates to the use of the multilayer films according to the invention, particularly a multilayer film of a polypropylene layer and two sealable layers, as packaging films, in particular for wrapping cigarette packs.

The production and processing of the sealing layer-forming composition, i.e. the metering and incorporation of the additives into the sealable layer polymer, and also the combination of this forming composition with the polypropylene core film may be carried out by standard methods, such as by lamination or melt extrusion.

It is advantageous to add directly the additives because this avoids the need for an expensive additive-master batch technique.

It is also advantageous to apply the forming composition to the core layer separately from the extrusion of the polypropylene film in a subsequent stage of the orientation process. The polypropylene film is preferably biaxially oriented, the sealing layer at least monoaxially.

Biaxial orientation may be carried out by the usual orientation process. In the multilayer film according to the invention, the polypropylene core layer should have a thickness of preferably from 10 to 50 $\mu$m and the sealing layer a thickness of preferably from 0.8 to 2 $\mu$m, more particularly 1 $\mu$m.

The multilayer films according to the invention may also be printed and provided with tear-open strips.

Test Methods

The wrapping cycle is judged on the basis of criteria decided by the machine operator, such as feed, wrapping and freedom from abrasion. Providing no disturbances involving these criteria occur during wrapping at relatively high speed, the film is regarded as satisfactory. However, even an occasional disturbance means that the film is unsatisfactory. It is assumed that the proper set up of the automatic wrapping machine before the test will preclude any other disturbances.

The strength of a weld seam is manually determined. It is sufficient if, when the seam is subjected to a shearing load, a distinct application of force is required to destroy the seam. The strength of the seam is also good if the wrapping film tears outside the seam when subjected to the same load.

Transparency is visually assessed from the finnished wrappings. The transparency of a wrapping is satisfactory if the printing can be read, i.e. if there is no clouding. Any loss of transparency will be shown up particularly clearly by dark printing.

The ash test is carried out after the film has been charged to a certain extent (by rubbing three times in one direction using a woolen cloth). The ash test is negative if cigarette ash is attracted by a charged film from a distance of approximately 3 cm.

EXAMPLE 1

0.5% by weight of N,N-bis-(2-hydroxyethyl)-amine, 0.5% by weight of an ethylene/methacrylic acid copolymer in which some of the carboxyl groups are present through Zn-salts and which has a density of 0.936 g/cc, a melt index of 5 g/10 mins at 190° C./1 kp/cm$^2$ and a melting point of 99° C. and 0.3% by weight of a polydimethyl siloxane having a density of 0.985 g/cc at 20° C. and a viscosity of 1 million cST at 20° C. are worked by co-extrusion at melt temperatures of around 225° C. into 98.7% by weight of a polyethylene having a density of 0.954 g/cc, a melt index of 3 g/10 mins. at 190° C./2.16 kp/cm$^2$ and a crystallite melting range of from 128° to 133° C.

This moulding composition is applied by a standard process to both sides of a polypropylene core layer and orientated. The core layer consists of polypropylene having a density of 0.905 g/cc, a melt index of 2 g/10 mins at 230° C./2.16 kp/cm$^2$ and a softening range of from 160° to 166° C.

The multilayer film formed therefrom has the following structure: 1 $\mu$m sealing layer/19 $\mu$m core film/1 $\mu$m sealing layer.

The advance of the film sections to the packing position of a wrapping machine wrapping 265 packs per minute takes place without disturbance.

Sealing at temperatures in the range from 138° to 143° C. leads to strong seams.

The wrapping is satisfactory. Variation of the machine folders keeps the effective folding in tact.

The machine operates without interruption for several hours. No abrasion occurs on sealing tools, format plates or guide rollers.

The transparency of the packing is good, i.e. the printing under the wrapping film is clearly visible.

The antistatic effect can be verified by the ash test.

The results are set forth in Table 1.

EXAMPLE 1a (Comparison Example)

The moulding composition for the sealing layer has the same composition as in Example 1. The production and thickness of the various layers also correspond to those of Example 1.

The multilayer film is, however, electrically treated by corona discharge so that the antistatic effect is clearly discernible not only by the ash test, but also by Shishido's measuring technique (half life of the discharge).

The film thus treated is not taken in smoothly by the wrapping machine because it does not slide sufficiently. The same applies to the wrapping of the pack. The better antistatic properties of the film have no effect.

EXAMPLE 2

The composition of the sealing layer is modified as follows:

98.5% by weight of an ethylene/propylene copolymer containing 4.5% by weight of ethylene and having a density of 0.901 g/cc, a melt index of 2 g/10 mins at 190° C./2.16 kp/cm$^2$ and a softening range of from 142° to 148° C. are mixed with 0.5% by weight of an amine as in Example 1, 0.5% by weight of a thermoplastic polymer as in Example 1 and 0.5% by weight of a polydimethyl siloxane as in Example 1.

This forming-composition is applied in the usual way to a polypropylene core layer and oriented with it.

The multilayer film has the same structure as in Example 1 with regard to the thickness of the layers.

The film behaves very well in high-speed wrapping machines wrapping 265 packs per minute, as can be seen from Table 1.

EXAMPLE 3

A sealing layer moulding composition is prepared from 99.0% by weight of the ethylene homopolymer according to Example 1, 0.5% by weight of the amine as in Example 1, 0.2% by weight of polylauric lactam melting at 176° to 180° C. and 0.3% by weight of the polydimethyl siloxane as in Example 1.

As in the preceding Examples, this moulding composition is applied in known manner to a polypropylene core film and oriented the multilayer film.

The layers of the multilayer film have the same thickness as in Example 1.

In high-speed wrapping machines wrapping 265 packs per minute the film can be used without disturbance. The sealing temperature is 146° C. The results of the test carried out on the multilayer film are set forth in Table 1.

TABLE

| Example No. | 1 | 2 |
|---|---|---|
| Sealing layer | % by weight | % by weight |
| Polyethylene | 98.7 | |
| Ethylene/propylene copolymer $C_2 > 4\%$ | | 98.5 |
| Additives | | |
| Aliphatic amine | 0.5 | 0.5 |
| Ethylene/methacrylic acid copolymer | 0.5 | 0.5 |
| Polylauric lactam | — | — |
| Polydialkyl siloxane | 0.3 | 0.5 |
| Packaging cycle | | |
| Feed | very good | very good |
| Sealing strength | very good | very good |
| Wrapping | very good | very good |
| Overall machine operation | very good | very good |
| Transparency | very good | very good |
| Antistatic | adequate | adequate |

| Example No. | 3 | 1a |
|---|---|---|
| Sealing layer | % by weight | % by weight |
| Polyethylene | 99.0 | 98.7 |
| Ethylene/propylene copolymer $C_2 > 4\%$ | | |
| Additives | | |
| Aliphatic amine | 0.5 | 0.5* |
| Ethylene/methacrylic acid copolymer | — | 0.5 |
| Polylauric lactam | 0.2 | — |
| Polydialkyl siloxane | 0.3 | 0.3 |
| Packaging cycle | | |
| Feed | very good | disturbed |
| Sealing strength | very good | very good |
| Wrapping | very good | unsatisfactory |
| Overall machine operation | very good | disturbed |
| Transparency | very good | very good |
| Antistatic | adequate | good |

*Film electrically pretreated

We claim:

1. A multilayer film comprising a polypropylene layer and at least one heat sealable layer comprising polyethylene or an ethylene copolymer containing at least 4% by weight of ethylene, the heat sealable layer containing an additive combination comprising:
   (1) from 0.3 to 1% by weight, based on the sealable layer, of a long-chain aliphatic amine;
   (2) from 0.1 to 0.7% by weight, based on the sealable layer, of dispersed thermoplastic polymer which is incompatible with the polyethylene or ethylene copolymer and which has a softening range which is not more than either 50° C. below or 50° C. above the softening point of the polyethylene or ethylene copolymer; and
   (3) from 0.3 to 0.8% by weight, based on the sealable layer, of a polydialkyl siloxane.

2. A multilayer film as claimed in claim 1, wherein the additive combination comprises from 0.4 to 0.7% by weight, based on the sealable layer, of the long-chain aliphatic amine.

3. A multilayer film as claimed in claim 1, wherein the additive combination comprises from 0.15 to 0.50% by weight, based on the sealable layer, of the dispersed thermoplastic polymer.

4. A multilayer film as claimed in claim 1, wherein the additive combination comprises from 0.3 to 0.6% by weight, based on the sealable layer, of the polydialkyl siloxane.

5. A multilayer film as claimed in claim 1, wherein the polypropylene is an isotactic polypropylene having a density of from 0.90 to 0.91 g/cc and a melt flow index of from 1 to 4 g/10 mins at 230° C./2.16 kp/cm$^2$ pressure.

6. A multilayer film as claimed in claim 1, wherein the sealable layer comprises a high-density polyethylene or a statistical ethylene/propylene copolymer containing 95% by weight of propylene and 5% by weight of ethylene.

7. A multilayer film as claimed in claim 1, wherein the long-chain aliphatic amine (1) is an N,N-bis-(2-hydroxyethyl)-($C_{12}$–$C_{16}$)-alkyl amine.

8. A multilayer film as claimed in claim 1, wherein the thermoplastic polymer (2) is an ethylene/methacyclic acid copolymer optionally at least partly present in the form of an alkali salt or polylauric lactam.

9. A multilayer film as claimed in claim 1, wherein the polydialkyl siloxane (3) is polydimethyl siloxane.

10. A packaging film especially for cigarette packs comprising a multilayer film as claimed in claim 1.

* * * * *